United States Patent [19]

Mosse et al.

[11] 4,304,802

[45] Dec. 8, 1981

[54] PROCESS FOR COATING GLASS OR CERAMIC ARTICLES

[75] Inventors: Michel Mosse, Bures-sur-Yvette; Henri Vanspeybroeck, Villiers St Sepulcre, both of France

[73] Assignees: Societe Francaise Duco, Stains; Societe Generale pour l'Emballage, Paris, both of France

[21] Appl. No.: 79,890

[22] Filed: Sep. 28, 1979

[30] Foreign Application Priority Data

Oct. 18, 1978 [FR] France .................................. 78 29646

[51] Int. Cl.$^3$ .............................................. B05D 3/02
[52] U.S. Cl. .................................. 427/386; 206/524.3; 215/DIG. 6; 427/195; 427/387; 427/393.6; 427/407.1; 427/407.2; 428/35; 428/429
[58] Field of Search ...................... 427/387, 386, 407.1, 427/407.2, 140, 165, 167, 168, 169, 302, 389.7, 421, 422, 393.6, 430.1, 443.2, 195; 428/35, 447, 429, 63, 412; 206/524.3; 215/DIG. 6, 12 R; 204/181 T, 181 R; 65/3 A, 3 C

[56] References Cited

U.S. PATENT DOCUMENTS

| | | | |
|---|---|---|---|
| 3,939,127 | 2/1976 | Labana et al. .................. | 427/386 X |
| 4,039,310 | 8/1977 | Sipe et al. ........................ | 65/25 R |
| 4,042,749 | 8/1977 | Sandvig .............................. | 428/412 |
| 4,059,473 | 11/1977 | Okami ............................ | 427/387 X |
| 4,084,021 | 4/1978 | Sandvig .......................... | 427/387 X |

FOREIGN PATENT DOCUMENTS

2293989  7/1976  France .
2303724 10/1976  France .
1545874  5/1979  United Kingdom .

Primary Examiner—Michael R. Lusignan
Assistant Examiner—Thurman K. Page
Attorney, Agent, or Firm—Burns, Doane, Swecker & Mathis

[57] ABSTRACT

This invention relates to a process for coating glass or ceramic articles, typically glass bottles, pre-coated with a surface treating agent, of the type comprising applying on the articles a first or basic layer of a silane, and then a layer of a crosslinkable film-forming material comprising a levelling agent, and then crosslinking said layer of film-forming material, wherein the levelling agent is selected from nonionic fluoroalkyl esters, epoxidized fatty acids derivatives, silicone oils and mixtures thereof.

This process provides a coating with good appearance and adhesion properties.

4 Claims, No Drawings

PROCESS FOR COATING GLASS OR CERAMIC ARTICLES

This invention relates to the coating of glass or ceramic articles and, more particularly, to the coating of glass bottles.

Such a coating has a high practical usefulness. Indeed, it makes it possible to enhance the physical characteristics of glass and, thus, permits a reduction of its thickness.

In addition, said coating should exhibit a good adhesion to glass, to permit reuse of the bottles after washing.

For this purpose, it has already been suggested in French Patent FR. 74/41 179 to apply a first or basic layer consisting of a silane, a second layer of a crosslinkable film-forming material containing a levelling or tension agent such as Modaflow (ethyl hexyl polyacrylate), and then to crosslink the layer of film-forming material.

A process of the same type was described in French Patent FR. 76/07 237. In said patent, it is suggested to use as levelling agents, besides Modaflow, other derivatives such as, particularly, acetates and solid silicone resins.

In fact, such coatings are not found entirely satisfactory. Indeed, they produce either a certain opalescence, or a highly insufficient tension of the layer of film-forming material (presence of an "orange peel" appearance), or even produce an embossed appearance, or dotted with craters.

On the other hand, such coatings have heretofore been applied only on uncoated bottles. Now, it is current practice for bottle manufacturers to apply thereon, after the post-baking step, surface treating agents designed to protect the outer surface of the bottles against scratches during handling. Incompatibilities may then appear between the surface treating agent and the coating of film-forming material.

This invention contemplates overcoming such various drawbacks while providing a coating having an attractive appearance, particularly a high transparency, together with good adhesion properties.

Thus, this invention relates to a process for coating glass or ceramic articles, typically glass bottles, precoated with a surface treating agent, of the type comprising applying to said articles a first silane layer, followed by a layer of crosslinkable film-forming material including a levelling agent, and then cross-linking said layer of film-forming material, said process being characterized in that the levelling agent is selected from non-ionic fluoroalkyl esters, epoxidized fatty acid derivatives, silicone oils and mixtures thereof.

Indeed, it has been found that the use of such levelling agents imparts to the coating particularly outstanding properties unobtainable with the conventional levelling agents used heretofore.

Such levelling agents may be used in an amount of about 0.1 wt% to about 5 wt% by weight of the film-forming material.

Useful crosslinkable film-forming materials include film-forming materials commonly used in this field, typically epoxy resins, epoxy-polyester resins, polyurethane resins and acrylic resins. Said resins consist, in a known manner, of a crosslinkable polymer and a crosslinking or curing agent.

Such resins are disclosed in the aforementioned patents, and also in French Patent FR. 76/23 680.

It has also been found that the coating is of particularly good quality, said coating being typically free from craters or blisters, when use is made, as surface treating agent, of oleic acid or of a polyoxyethylene monostearate containing from 8 to 40 ethoxy groups per molecule.

It has been found, in addition, that the adhesion of the coating is very markedly improved when the silane used is selected from gammaglycidoxy propyl trimethoxysilane, vinyltriacetoxysilane and gammaaminopropyltriethoxysilane. Said silanes may be applied in conventional manner, as aqueous solutions (usually at a concentration of 2 or 3 wt%).

According to a further feature of this invention, the silane may be applied simultaneously with the surface treating agent. Such a procedure makes it possible to avoid a coating step and, thus, to simplify the equipment required for the process.

The process according to the present invention may be carried out in the following manner:

The first layer, the silane layer, is applied as an aqueous solution, either in the cold on bottles previously treated with a surface treating agent, or in the cold or at moderate temperatures ($<150°$ C.) on bottles which have not been given a surface treatment. In the latter case, the silane is added to the solution of surface treating agent.

The first layer of silane or of surface treating agent-silane mixture is applied by any conventional means, and advantageously by means of a pneumatic spray-gun; the means for the protection of the ring and the inner portion of the bottles may be those disclosed in FR. 76/23 680. The bottles are then submitted to a thermal treatment, for the purpose of removing the aqueous phase and of attaining a sufficient temperature level for the application of the layer of film-forming material. Said thermal treatment may be effected with any conventional means.

Typically, such a treatment may be effected immediately after deposition of the silane layer, by means of infrared radiations of a wavelength specially adapted to the heating of glass, as disclosed in French patent application No. 75/19 953. Such a type of heating makes it possible to obtain rapidly, and in a manner compatible with a high-rate production, the thermal reserve useful for the application and the crosslinking of the layer of film-forming material. Convection heating may also be used.

The layer of film-forming material is deposited preferably as a fine powder, by immersion in an electrostatic or non-electrostatic fluidized bath, or by means of an electrostatic gun. This surface layer is then crosslinked by means of a suitable heat-treatment which may be effected with any conventional technique: such as heating by means of a hot air convector, IR radiations, or gas or electric heating, or microwave heating. The glass articles are then cooled, either naturally or by an accelerated procedure, under an air atmosphere or with a liquid, by spraying or immersion.

Other characteristics and advantages of this invention will become apparent from the following description of Examples embodying the process of this invention, which are given solely for illustrative purposes.

EXAMPLE 1

Handy BSH type beer bottles, having a capacity of 34.5 cl, having previously been submitted to a surface treatment with vapor phase oleic acid, are coated with a 3 wt% aqueous solution of gammaglycidoxypropyl trimethoxysilane, the pH of the solution having been adjusted to a value of 4 by means of a weak acid; the amount of solution deposited is about 0.5 ml per bottle. The bottles are then placed in an oven provided with infrared emitting means, in which they are heated within about 2 minutes to an external skin temperature of about 210° C. The pre-heated bottles are then coated (to a thickness of about 80 microns) with the layer of powdered film-forming material prepared by mixing and grinding the following components:

| | |
|---|---|
| - epoxy resin obtained from epichlorohydrin and bisphenol A; epoxy number: 900; melting temperature: 95° C. | 100 parts |
| - 2-phenyl imidazoline | 6.5 parts |
| - nonionic fluoroalkyl ester(commercially available under the tradename Fluorad FC 430 manufactured by 3M FRANCE) levelling agent | 0.5 part |

The powder is produced by mixing and dispersing the above materials in a Komalaxeur PR 100 type extruder available from BUSS, at a temerature of 100° C., after which the mixture is cooled and powdered to a particle size of 5–80 microns.

The bottles are then placed in an oven provided with infrared emitting means (infrared radiation of short wavelength) to effect the crosslinking of the powder. The duration of the treatment is 4 minutes at 180° C. The bottles are then cooled naturally.

The bottles thus produced have a clear sparkling appearance and retain their original shade. They are smooth and hard to the touch.

To evaluate the properties of the bottles coated according to the process of this invention, the following test is carried out.

Recycling ability test

The bottles, filled with water and stoppered, are immersed in a 3.5% sodium hydroxide solution for 60 minutes at 70° C. after which they are rinsed with tap water for a few minutes, and then placed, still full and stoppered, in an abuse Line Simulator ACR for 5 minutes, under a water spray. The bottles are then placed for 45 minutes on a linear conveyor on which they are immobilized, said conveyor moving at a rate of 40 m/mn. The bottles are then examined: no defect (such as tear or peeling off, and the like) is noted. The above test is repeated 15 times, and the behavior of the plastic coating is found most satisfactory, since no adhesion or peeling defect is apparent.

EXAMPLE 2

Bottles are coated under the same conditions as in Example 1, except that vinyltriacetoxysilane is used as adhesion silane. The behavior of the bottles is analogous to that described in Example 1.

EXAMPLE 3

Bottles are coated under the same conditions as in Example 1, except that the test bottles have been submitted, after a post-baking step, to a surface treatment with a polyoxyethylene monostearate containing about 24 ethoxy groups per molecule. The results obtained are identical with those of Example 1.

EXAMPLE 4

Bottles are coated under the same conditions as in Example 1, except that the surface treating agent (identical with the one used in Example 3) is deposited simultaneously with the adhesion silane (gammaglycidoxypropyl trimethoxysilane), the concentrations in the aqueous solution being 3 wt% and 0.3 wt%, respectively, and the pH of the solution being between 4 and 5; on the other hand, the above solution is coated on bottles at a temperature of 70°–130° C. The behavior of the bottles, when submitted to the simultaneous abuse test, is comparable to that described in Example 1.

EXAMPLE 5

Bottles are coated according to the procedure of Example 1, except that use is made of the levelling agent shown in following Table I, at the concentration given in said Table.

Note: the epoxydized soy oil (Ecepox BP 1) has the following characteristics:

| | |
|---|---|
| - oxiran oxygen level | 3.8 wt % |
| - iodine number | 2.6% (g iodine absorbed per 100g of material) |
| - acid number | 0.61 (mg KOH/g) |
| - refractive index at 20° C. | 1.473 |
| - specific gravity at 22° C. | 0.996. |

It is apparent from Table I that the use of levelling agents according to this invention provides coatings having a much better appearance than those obtained with agents according to the prior art (Modaflow, acetals, solid silicone resin).

EXAMPLE 6

Bottles are coated according to the procedure of Example 4, using a 1% aqueous solution of polyoxyethylene glycol monostearate comprising about 24 ethoxy groupe per molecule admixed with 2% gammaglycidoxy propyl trimethoxysilane and a powdered epoxy-polyester resin having the following composition:

| | |
|---|---|
| - Powdered saturated polyester resin (66 parts terephthalic acid, 34 parts neopentylglycol) Acid n°: 50; hydroxyl n°: 10 | 50 parts, by weight |
| - Epoxy resin resulting from the condensation of epichlorohydrin with bisphenol A, molecular weight: 1400 | 50 parts, by weight |

To both the above resins are added one or two levelling agents the composition and dosage of which are given in following Table II.

The above materials are mixed and dispersed in a Komalaxeur PR 46 type extruder from BUSS, at a temperature of the order of 100° C. The mixture is then cooled and powdered to a particle size of 5–80 microns.

This powder is applied electrostatically on pre-heated bottles.

The results obtained are set forth in Table II.

EXAMPLE 7

The procedure of Example 6 is used, except that use is made of a polyurethane powder having the following composition:

| | |
|---|---|
| - Masked isocyanate (isophorone diisocyanate + diethylene glycol + caprolactam) | 50 parts by weight |
| - Powdered saturated polyester resin (31 parts terephthalic acid + 60 parts 1,1-isopropylidene bis(phenylene)diethanol + 9 parts neopentyl glycol Acid n°: 1.6 Hydroxyl n°: 62 | 75 parts by weight |
| - Tin isocarboxylate (accelerator) | 0.2 part, |

-continued

| | |
|---|---|
| | by weight |

To these various ingredients are added one or two levelling agents whose composition and dosage are given in following Table III.

The above materials are mixed and dispersed in a Komalaxeur PR 246 type extruder available from BUSS, at a temperature of the order of 100° C.

The mixture is then cooled and powdered to a particle size of 5–80 microns. This powder is applied electrostatically on pre-heated bottles.

The results obtained are set forth in following Table III.

TABLE I

| Chemical nature | Trade name | Manufacturer | concentration weight % epoxy resin | Results obtained: appearance of the coating | |
|---|---|---|---|---|---|
| | | | | Transparency | Film levelling |
| Non ionic fluoroalkyl ester | Fluorad FC 430 or FC 431 | 3M FRANCE | 0.2 | Excellent " | Good " |
| Silicon oil (methylphenyl polysiloxane) | Rhodorsil 640 V 100 | RHONE POULENC INDUSTRIES | 0.2 | Slight opalescence | Fair |
| Solid silicon resin | BYCK 300 | BYCK MAILINCKRODT | 0.5 | Very good | Poor |
| Ethyl-hexyl polyacrylate | Modaflow | MONSANTO | 0.5 | Opalescence | Good |
| Polyvinyl Butyral | B 30 H | HOECHST | 1 | Opalescence | Good |
| Epoxydized soy oil | Ecepox BP 1 | PCUK | 3 | Excellent | Very good |
| Fluoroalkyl ester | Fluorad FC 430 | | 0.2 | | |
| Epoxydized soy oil | Ecepox BP 1 | | 3 | Very good | Good |
| Silicon oil | 640 V 100 | | 0.1 | | |

TABLE II

| Chemical nature | Trade name | Manufacturer | concentration weight % epoxy resins polyester | Results obtained: appearance of the coating | |
|---|---|---|---|---|---|
| | | | | Transparency | Film levelling |
| Non ionic fluoroalkyl ester | Fluorad FC 430 or FC 431 | 3M FRANCE | 0.2 | Excellent " | Good " |
| Silicon oil (methylphenyl polysiloxane) | Rhodorsil 640 V 100 | RHONE POULENC INDUSTRIES | 0.2 | Good | Fair |
| Silicon resin | BYCK 300 | BYCK MALLINCKRODT | 0.5 | Very good | Poor |
| Ethyl-hexyl polyacrylate | Modaflow | MONSANTO | 0.5 | Opalescence | Good |
| Polyvinyl Butyral | B 30 H | HOECHST | 1 | Opalescence | Good |
| Epoxydized soy oil | Ecepox BP 1 | PCUK | 3 | Excellent | Very good |
| Fluoroalkyl ester | Fluorad FC 430 | | 0.2 | | |
| Epoxydized soy oil | Ecepox BP 1 | | 3 | Very good | Good |
| Silicon oil | 640 V 100 | | 0.1 | | |

TABLE III

| Chemical nature | Trade name | Manufacturer | concentration weight % polyurethane resin | Results obtained: Appearance of the coating | |
|---|---|---|---|---|---|
| | | | | Transparency | Film levelling |
| Non ionic fluoroalkyl ester | Fluorad FC 430 or FC 431 | 3 M FRANCE | 0.2 | Excellent | Good |
| Silicon oil (methylphenyl polysiloxane) | Rhodorsil 640 V 100 | RHONE POULENC INDUSTRIES | 0.2 | Good | Fair |
| Ethyl-hexyl polyacrylate | Modaflow | MONSANTO | 0.5 | Opalescence | Good |
| Polyvinyl Butyral | B 30 H | HOECHST | 1 | Opalescence | Good |
| Epoxydized soy oil | Ecepox BP 1 | EPCUK | 3 | Excellent | good |
| Fluoroalkyl ester | Fluorad FC 430 | | 0.2 | | |

TABLE III-continued

| Chemical nature | Trade name | Manufacturer | concentration weight % polyurethane resin | Results obtained: Appearance of the coating | |
|---|---|---|---|---|---|
| | | | | Transparency | Film levelling |
| Epoxydized soy oil | Ecepox BP 1 | | 3 | Excellent | Very Good |
| Silicon oil | 640 V 100 | | 0.1 | | |

Having now described our invention what we claim as new and desire to secure by Letters Patent is:

1. Process for obtaining a transparent and adherent coating without craters or blisters on glass or ceramic articles pre-coated with a surface treating agent, comprising applying on the articles a first or basic layer of a silane, and then a layer of crosslinkable film-forming material comprising a levelling agent, and then crosslinking said layer of film-forming material, wherein the levelling agent is selected from nonionic fluoroalkyl esters, epoxydized fatty acid derivatives, silicone oils and mixtures thereof; and the surface treating agent is selected from oleic acid and polyoxyethylene monostearates.

2. Process as claimed in claim 1, wherein said silane is selected from gammaglicydoxy propyl trimethoxysilane vinyl-triacetoxysilane and gammaaminopropyl triethoxysilane.

3. Process as claimed in claim 1, wherein the silane is applied simultaneously with the surface treating agent.

4. Process for obtaining a transparent and adherent coating on glass or ceramic articles pre-coated with a surface treating agent, comprising applying on the articles a first or basic layer of a silane, and then a layer of crosslinkable film-forming material comprising a levelling agent, and then crosslinking said layer of film-forming material, wherein the levelling agent is selected from nonionic fluoroalkyl esters, epoxydized fatty acid derivatives, silicone oils and mixtures thereof; the surface treating agent is selected from oleic acid and polyoxyethyleneglycol monostearates, and the silane is selected from gammaglicydoxypropyl trimethoxysilane, vinyltriacetoxysilane and gammaaminopropyltriethoxysilane.

* * * * *